Figure 1:
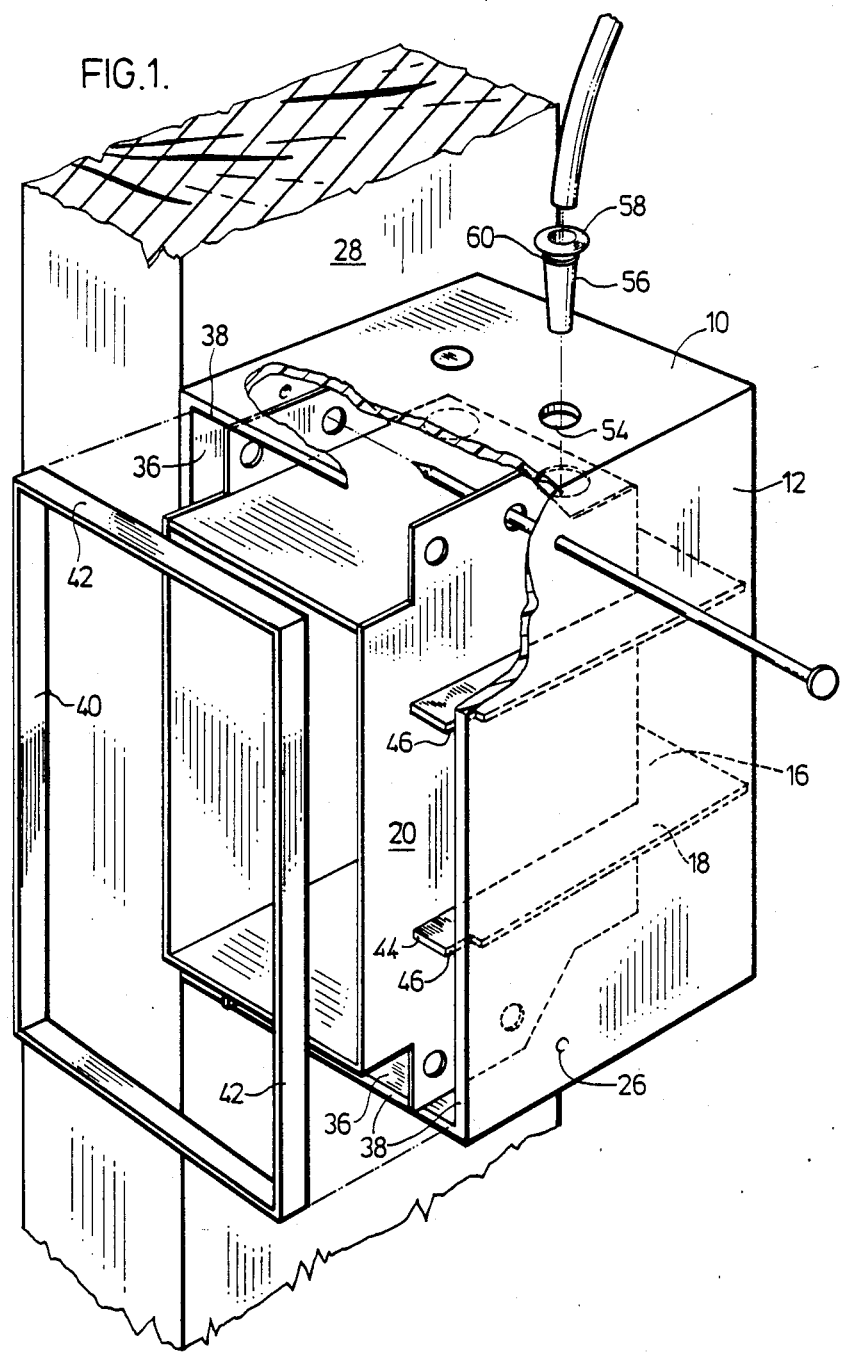

United States Patent [19]

Rye

[11] Patent Number: 4,626,617
[45] Date of Patent: Dec. 2, 1986

[54] CONTAINER FOR ELECTRICAL OUTLETS

[76] Inventor: Glen Rye, R.R. #2, Keswick, Ontario, Canada, L4P 3E9

[21] Appl. No.: 690,031

[22] Filed: Jan. 9, 1985

[30] Foreign Application Priority Data

Jan. 26, 1984 [CA] Canada ................................. 446,053

[51] Int. Cl.$^4$ ............................................ H02G 3/08
[52] U.S. Cl. .................................... 174/53; 174/65 G
[58] Field of Search ................... 174/53, 58, 66, 65 G; 220/3.2, 3.3, 3.4, 3.5, 3.6, 3.8, 3.9

[56] References Cited

U.S. PATENT DOCUMENTS 2,225,472 12/1940 Franklin ....................... 174/65 G X
3,251,130 5/1966 Miles ............................... 220/3.4 X
3,863,021 1/1975 Schindler et al. ...................... 174/53
4,134,636 1/1979 Kleinatland et al. ............ 220/3.9 X
4,345,693 8/1982 Balkwill et al. ....................... 220/3.3

FOREIGN PATENT DOCUMENTS 1101978 5/1981 Canada ................................. 174/53

Primary Examiner—Arthur T. Grimley
Assistant Examiner—D. A. Tone

[57] ABSTRACT

A container for an electrical outlet box is designed for use in combination with a vapor barrier of flexible material. The container is a unitary molded container with a front opening and a ring member is designed to slide over the container adjacent the front opening and to clamp the flexible barrier material between the ring and the container.

14 Claims, 8 Drawing Figures

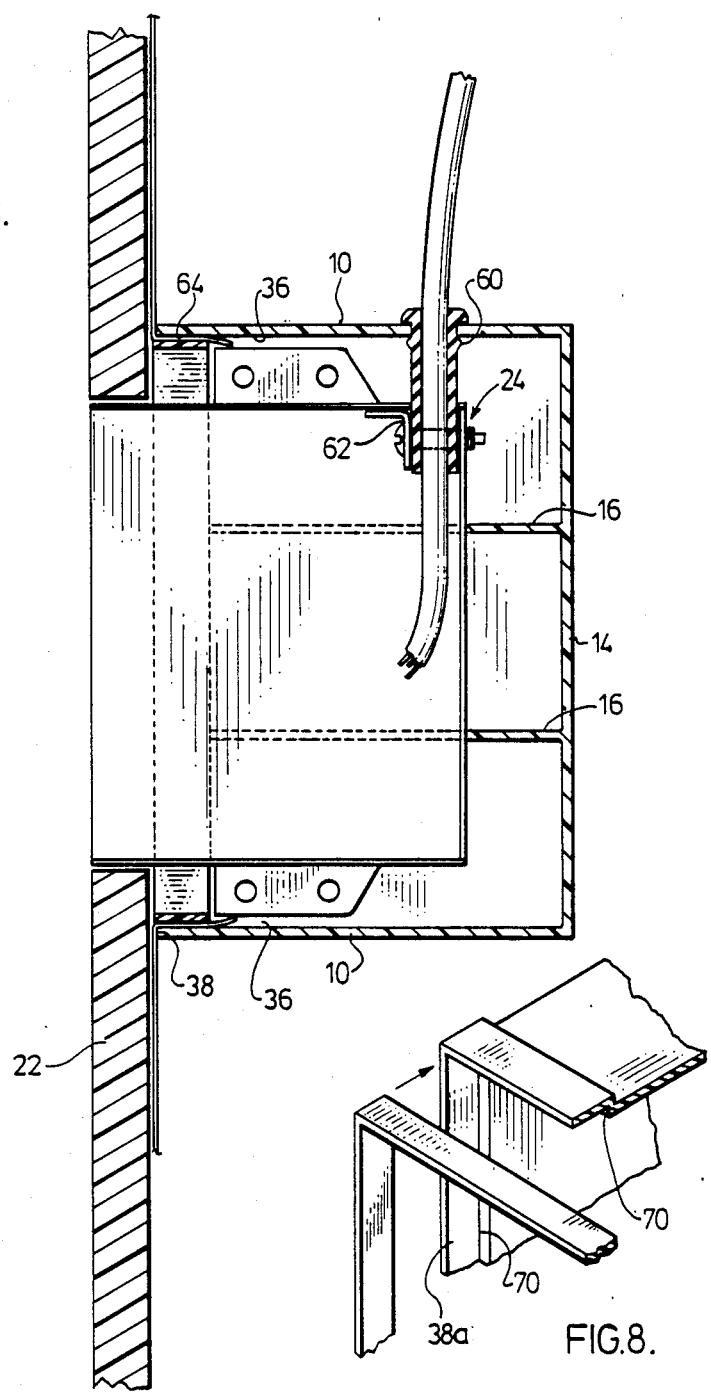

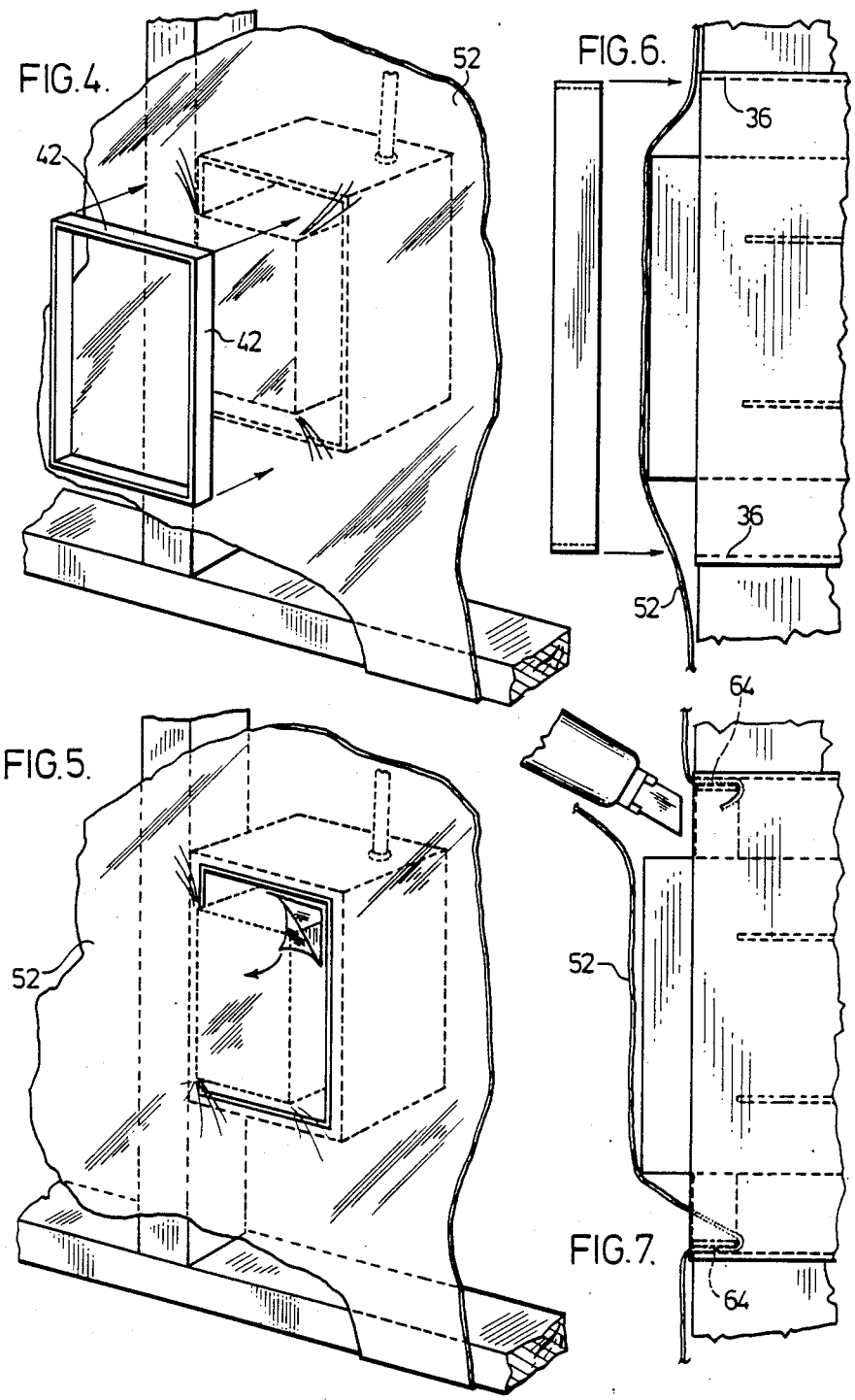

CONTAINER FOR ELECTRICAL OUTLETS

This invention relates to a unitary molded container for electrical outlet boxes which is specifically designed for sealing to the flexible vapor barrier whereby a vapor seal is provided which prevents the passage of air and vapor between the inside of the rooms of a house, and the outside, which seal is better than those previously achieved.

By the term 'electrical outlet box' herein, we refer to the box for mounting wall, ceiling, or floor electrical outlets, fixtures, lights, smoke detectors and the like. Since the inventive container is designed for cooperation with a flexible vapor barrier, such container will customarily be used with electrical outlet boxes which are located on outside walls, ceilings or floors.

By 'forward' and 'rearward' herein we mean the directions toward and away from the inside of the room.

Prior to this invention the conventional method preventing vapor and air passage through electrical outlet boxes was to wrap the electrical outlet box with a plastic sheet, and then drive nails and wires through it, creating vapor leaks. The plastic sheet was then pulled through a hole in the vapor barrier and an attempt made to tape the sheet to the flimsy, flexible vapor barrier. This method did not give a good seal against air and vapor passage inward and outward through and about the outlet and, due to the manipulation and taping required, was costly to the builder or contractor.

The invention provides a container having side and rear walls and being forwardly open and dimensioned to receive at least the rearward portion of an electric outlet box. The side walls adjacent their forward edges define generally forwardly-rearwardly extending surfaces (which may be bevelled) which surfaces together substantially surround the front opening. A ring member is provided having surfaces designed to be complementary to and to slide upon said side wall surfaces. With this arrangement the material of the flexible vapor barrier which will be extended over the wall area including the outlet box, may be clamped between the ring and the side wall surfaces.

There is thus provided a container for the electric outlet box which forms a positive but simple seal to the vapor barrier surrounding the box. The seal is more complete and its provision simpler than with the prior method.

The invention extends to containers having forward-rearward extending surfaces which are on the inside or the outside of the container side walls and thus cooperate with rings respectively inside and outside the container side walls. However, it is believed considerably superior to provide the container surfaces on the inside of the said walls with a ring sliding thereon inwardly of such side walls. The latter arrangement has an advantage in that it tends to draw the surrounding vapor barrier material toward the container and also because it provides a better seal between the vapor barrier and the container than the alternate arrangement.

Features and advantages of preferred forms of the invention are discussed in connection with the preferred embodiment to be described.

Figure 2:
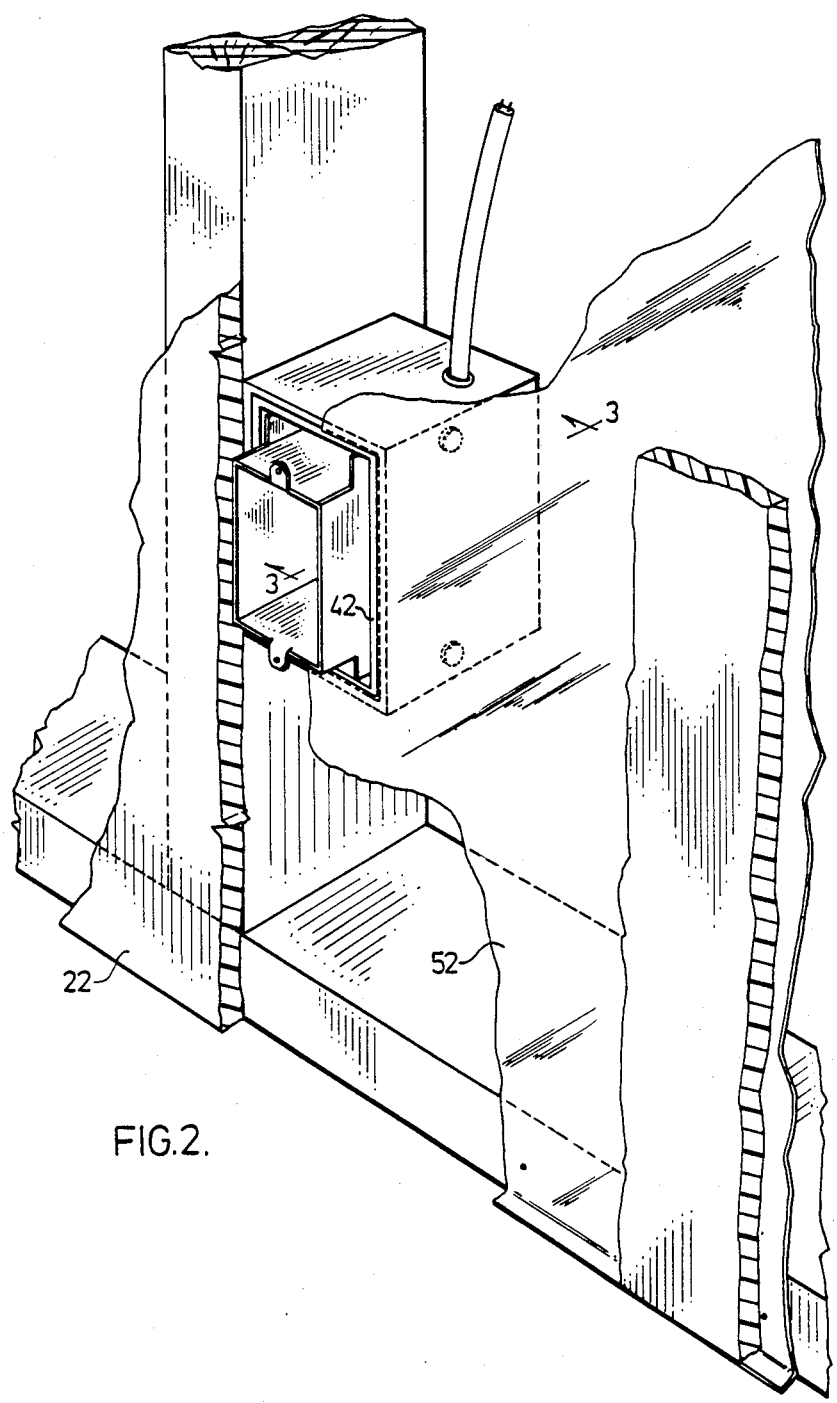

In drawings which illustrate a preferred embodiment of the invention:

FIG. 1 is a perspective, partially exploded view of the container and an electrical outlet box in situ, FIG. 2 is a perspective of the container in sealing relationship to the vapor barrier, FIG. 3 is a sectional view along the lines 3—3 of FIG. 2, FIGS. 4 and 5 are perspective views showing the manner of connecting the container to the vapor barrier, FIGS. 6 and 7 are sectional views corresponding respectively to FIGS. 4 and 5, FIG. 8 demonstrates an alternative ring and container arrangement to that shown in FIG. 1.

In the drawings the container comprises short side walls 10, long side walls 12 and rear wall 14 and defines a front opening. The container preferably provides a pair of ribs 16 projecting inwardly from the rear wall and a pair of ribs 18 projecting inwardly from each of the long side walls 12. In the preferred embodiment each rib 16 extends into a side wall rib 18 at each end. However, it is equally suitable to have separate side and rear ribs. The purpose of the rear ribs 16 is to support the electrical outlet box 20 whose near portion is in the container, at a desired amount of forward projection beyond the forward edges of the container side walls. As best shown in FIG. 3 the forward projection of the outlet box 20 is to bring the forward edge of the box flush with outer surface of the drywall 22. The rearward ribs 16 are required also because of rearward projections, such as that shown at 24, from the rear wall of the electrical outlet box 20. The side ribs 18 are primarily designed to support the outlet box 20 at the desired transverse location in the container.

The container is a unitary molded construction preferably plastic and the preferred plastic may be polyvinylchloride or polypropylene. The container is provided with thinner areas 26 on its side walls to allow the passage of nails, as shown in FIG. 1 through one wall of the container, the support holes of the outlet box 20 and the opposite wall of the container. The nails therefore mount both container and outlet box on the stud 28. It will be obvious from the description so far that a given container molding in accord with the invention will only be adapted to support and mount some of the wide variety of electrical outlet boxes. Other outlet boxes will require different side or rear rib sizes or different locations weakened for the passage of nails or different dimensions for the walls.

The inner surfaces 36 of the side walls adjacent the forward edges 38 extend in a forward-rearward direction and their functional area ends at the forward end of the side ribs 18. The surfaces 38 extend about the opening of the container. A ring 40 is designed to have peripheral outer surfaces 42 which slide over all of the surfaces 36. The forward end 44 of the ribs 18 could (in an embodiment not shown) form the rearward stop for the rearward movement of ring 42 when pressed into the container. However, it is preferred to extend the ribs 18 forwardly of the rearmost desired location for ring 42 and to notch the ribs 18 at 46 to receive the rearward portion of the ring 42 between the ribs and the side wall. This supports the ring 42 and improves the seal with the vapor barrier. The root of notch 46 then provides a rearward stop for ring 42. Alternatively, the ribs 18 may if desired, be terminated at a location rearward of the desired rearward ring location and rearward stops for the ring otherwise provided, or even omitted. If the stops are omitted the ring 42 will remain in position by friction although less positively than in the stopped alternative. In use, and as hereafter for the ring more fully described, the flexible vapor barrier film 52 is laid over the container and outlet box and then sealed to the container by rearward insertion of the ring 42 into the box which clamps the extent of film 52 between the ring 42 and surfaces 36 of the container and effectively seals the film to the container.

As shown, the molded container preferably provides, toward the rear, an opening 54 in which a separate grommet 56 may be provided, preferably formed of flexible rubber. The grommet 56 has an outer ring 58 to limit its entrance into the container and outer bumps 60, to prevent its chance withdrawal. The outer surface of the grommet between ring 58 and bumps 60 is designed to seal with the opening defining surfaces of the container walls. The grommet 56 preferably extends inwardly a sufficient distance that it surrounds the wire at the location where the wire is clamped (see Clamp 62) to the electrical outlet box. Thus the inner bore of the grommet 56 is designed to make a good seal with the outer surface of the wires and preferably the grommet extends far enough to be clamped by the clamping means 62 as above described, further improving the air and vapor seal about the wires. Although the opening 54 is shown aligned with the wire opening in the electrical outlet box, the flexible grommet can compensate for a reasonable misalignment of these openings. In some cases a different outlet box type will require a different location for opening 54 or the grommet 56 may be used in the misaligned location relying on the seal between itself and the wires but without reaching the clamping location.

FIGS. 4 and 6 show the container (without ring) and outlet box installed and the vapor barrier flexible material 52 (usually polyethylene) installed thereover. As FIGS. 4 and 6 indicate the ring 42 is then installed by pressing it rearward, which has the effect of clamping and sealing the extent 64 of the barrier material between the ring and the wall, and draws the barrier material toward the container. As indicated in FIGS. 5 and 7, the barrier material is then cut away inside the ring 42. The fixture may then be attached to the outlet box and the drywall 22 applied thereabout. With the container thus sealed to the vapor barrier material it is noted that the grommet 56 tends to prevent the passage of air and vapor between the container and the wires. The weakened portions 26 of the container where the nails pass tend to cling to the nails tending to prevent the passage of air between the nails and the container. A good seal is therefore provided by the container in combination with the vapor barrier and the method of sealing the container to the vapor barrier is simple and quick.

FIG. 8 shows an alternative construction where the outer portions of the side walls 12 are stepped outwardly to provide the surfaces 38A on which the outer complementary surfaces of ring 42 slides and which clamp the film between surfaces and ring. The step 70 then provides the rearward stop for insertion of the ring.

It is a useful alternative, instead of strictly forward and rearward surfaces on side walls and ring, to bevel the side wall surfaces to slope in a direction to widen the opening in the outer direction and to slope the outer surfaces of the ring in a complementary manner. This improves the sealing effect and lessens the requirement for stops.

Although the preferred embodiment shows a simple rectangular outlet box and a corresponding container, it will be obvious that the container may be shaped and dimensioned to enclose electrical boxes which are octagonal, round, square or otherwise but which container provides, at its forward edges, a peripheral ring of forwardly-rearwardly extending surfaces on which the complementary surfaces of a ring may slide and therefore clamp and seal the vapor barrier material between ring and side walls.

Reference is made in the introduction to the alternative where the forward portions of the container side walls mount the ring on the outside of the container with the film clamped between the cooperating and complementary surfaces. This is within the scope of the invention but will not provide as good a seal between the film and the container as the preferred embodiment nor will it draw the film toward the container.

I claim:

1. Container for electrical outlet box for use in combination with a vapor barrier of flexible material, comprising:

a unitary molded container having side and rear walls and a front opening, said container being designed and dimensioned to receive at least the rearward portion of an electric outlet box therein, the side walls adjacent their forward edges defining generally forward-rearward extending surfaces which together substantially surround the front opening, a ring member, having surfaces designed to be complementary to and to slide upon said side wall surfaces, a flexible vapor barrier retained in place between said ring surfaces and said container surfaces.

2. Container as claimed in claim 1 wherein said side wall surfaces are on the inner side of said side walls.

3. Container as claimed in claim 2 wherein said forward-rearward surfaces are bevelled in a sense to widen the container opening in the forward direction.

4. Container as claimed in claim 2 having a molded opening for the passage of electric wires, said opening having defining edges a grommet mounted in said opening, said grommet having an outer surface for sealing against the defining edges of said opening and an inner surface for sealing against the outer surface of said wires.

5. Container as claimed in claim 4 wherein said grommet is designed to extend inwardly from said opening about said wires, to be clamped about said wires by means in said electrical outlet box.

6. Container as claimed in claim 1 having means in the side wall thereof for the insertion of nails to mount said container and the electrical outlet box.

7. Container as claimed in claim 1 having a molded opening for the passage of electric wires, said opening having defining edges a grommet mounted in said opening, said grommet having an outer surface for sealing against the defining edges of said opening and an inner surface for sealing against the outer surface of said wires.

8. Container as claimed in claim 7 wherein said grommet is designed to extend inwardly from said opening about said wires, to be clamped about said wires for clamping by means in said electrical outlet box.

9. Container for electrical outlet box for use in combination with a vapor barrier of flexible material comprising:

a unitary molded container having side and rear walls and a front opening, said container being designed and dimensioned to receive at least the rearward portion of an electric outlet box therein, the side walls adjacent their forward edges defining generally forward-rearward extending surfaces which together substantially surround the front opening, a ring member, having surfaces designed to be complementary to and to slide on said side wall surfaces, whereby the material of a flexible vapor barrier may be retained in place between said ring surfaces and said container surfaces, having means for supporting the outlet box therein at a location whereat the electrical outlet box will project forwardly beyond the forward edges a predetermined distance.

10. Container as claimed in claim 9 wherein said side wall surfaces are on the inner side of said side walls.

11. Container for electrical outlet box for use in combination with a vapor barrier of flexible material, comprising:

a unitary molded container having side and rear walls and a front opening, said container being designed and dimensioned to receive at least the rearward portion of an electrical outlet box therein, the side walls adjacent their forward edges defining generally forward-rearward extending surfaces which together substantially surround the front opening, a ring member, having surfaces designed to be complementary to and to slide upon said side walls surfaces, whereby the material of a flexible vapor barrier may be retained in place between said ring surfaces and said container surfaces, wherein said side wall surfaces are on the inner side of said side walls, and wherein ribs are provided on the inside of at least two opposite ones of said side walls and the forward ends of said ribs are located to form a stop to rearward movement of said ring on said wall surfaces.

12. Container as claimed in claim 11 wherein said side walls are shaped so that said inner surfaces terminate rearwardly at an inward step designed to form a rearward stop for the insertion of said ring.

13. Container as claimed in claim 11 wherein ribs are provided on the inside of at least two opposite ones of said side walls and the forward ends of said ribs are notched to receive a rearward extent of the ring.

14. Container as claimed in claim 13 wherein the root of the notch forms a stop for rearward movement of said ring.

* * * * *